Figure 1:
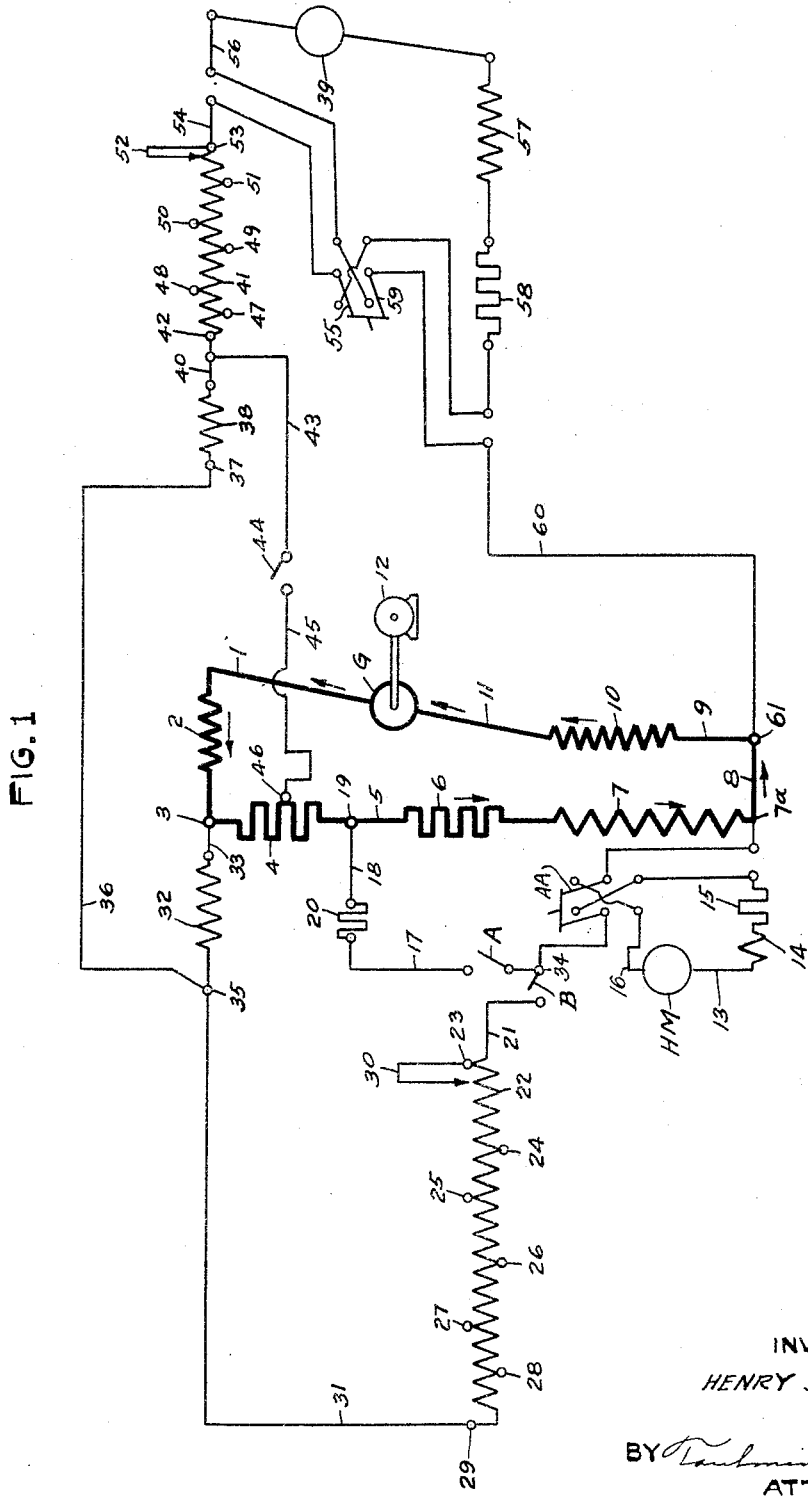

Nov. 29, 1932.　　　H. S. JACOBS　　　1,889,035
HOIST AND CROWD COMBINED CONTROL SYSTEM FOR ELECTRIC SHOVELS
Filed April 26, 1929　　2 Sheets-Sheet 1

INVENTOR
HENRY S. JACOBS.

BY *Toulmin & Toulmin*
ATTORNEYS

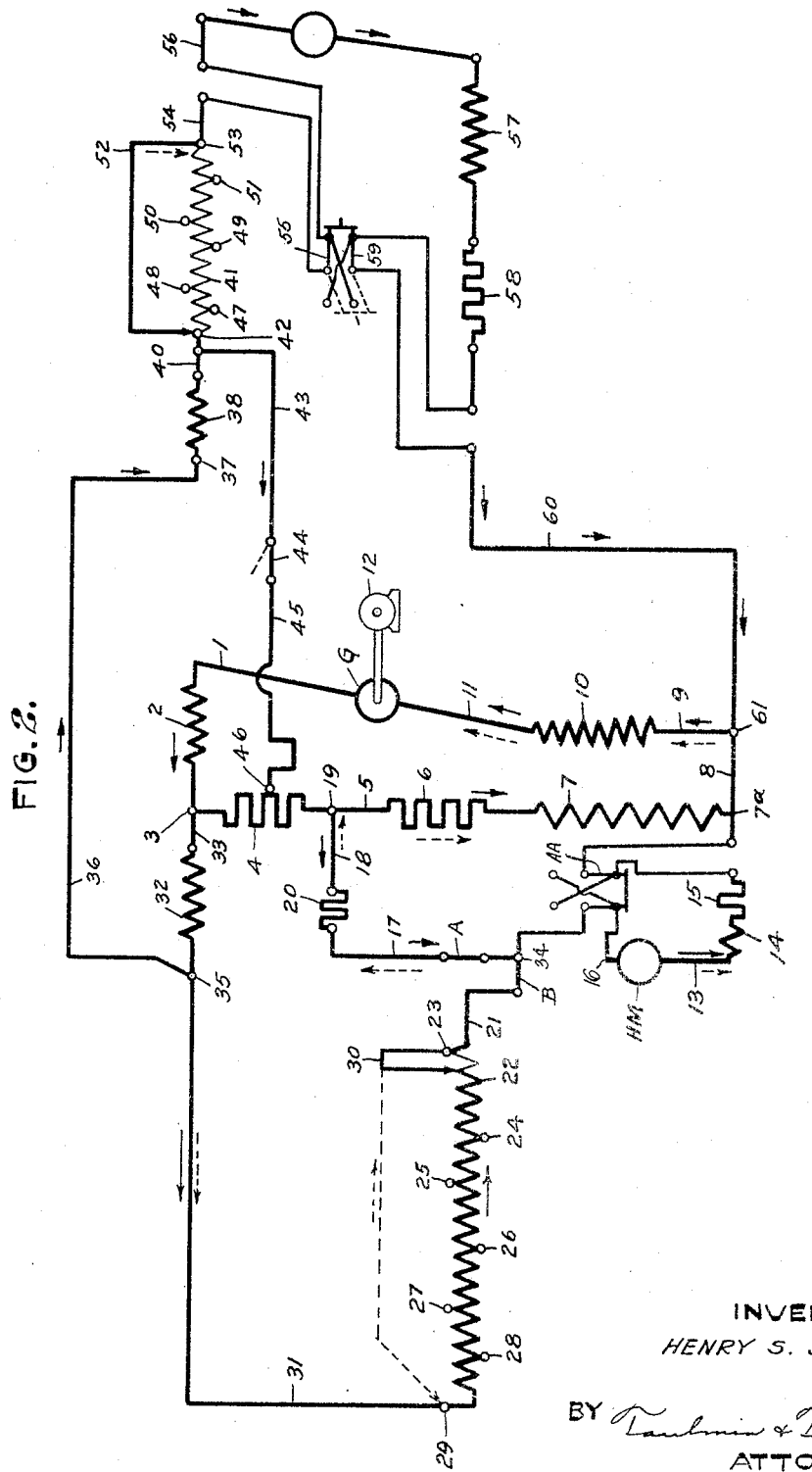

Patented Nov. 29, 1932

1,889,035

UNITED STATES PATENT OFFICE

HENRY S. JACOBS, OF MARION, OHIO, ASSIGNOR TO THE MARION STEAM SHOVEL COMPANY, OF MARION, OHIO, A CORPORATION OF OHIO

HOIST AND CROWD COMBINED CONTROL SYSTEM FOR ELECTRIC SHOVELS

Application filed April 26, 1929. Serial No. 358,364.

It is the object of my invention to provide an electrical control system particularly adapted for electrically driven excavating equipment, such as shovels.

It is the object of my invention to provide an electrical control system for the hoisting of the dipper and for the crowding of the dipper into the material to be hoisted so that the motion which raises the dipper through the bank and the motion which forces the dipper into the bank will be effected with electrical equipment having the following desired characteristics.

Such characteristics are the capacity for very quick starting, that is, high speed acceleration of the electrical equipment; the bringing of the hoist or crowd motor up to speed in the most satisfactory fashion; the operation of the hoist or the crowd mechanism by a single controller with a single handle so that one continuous movement of the operator will bring the shovel into full operation; the maintenance of very high speeds when the load is light so as to lift the light load at high speed; the ability to lift a heavy load at low speed; and the ability to exert the maximum pull at stall without undue mechanical or electrical strains.

It is a further object to provide equipment having such characteristics with the accompanying characteristics of long life of the motors, decreased maintenance costs, decreased lost time, decreased power consumption per unit of work done and a better relationship between the speed and torque delivered by the motors.

It is a further object to provide equipment in which the time lag of protective electrical equipment heretofore used is largely eliminated.

It is a further object of my invention to provide electrical control equipment of such small size and compact nature that there is not only economy in cost but in the space occupied which is a material factor on an electric shovel where the floor space is extremely limited.

It is a particular object of my invention to reduce the extent of heating of the control equipment.

It is an object to provide for smoother acceleration of the motor, better commutation of the motor and generator and less severe mechanical and electrical strains on the equipment.

In particular it is my object to furnish a low inductive generator shunt field with a corresponding low resistance shunt field winding; means for reducing voltage of the generator immediately prior to placing the motor on the circuit in order to decrease the current inrush of the motor when the motor armature circuit is closed; and the raising of the generator voltage by proper field control while simultaneously cutting out motor starting resistance. The results of these particular objects are the utilization of a generator circuit, a motor circuit and a field bleeder circuit preferably associated with permanent resistors and a variable armature resistance in the motor circuit.

It is my object to prevent poor commutation on the motor and generator; to prevent excessive and unnecessary heating of both the motor and generator; to prevent excessive mechanical and electrical strains; to make possible a decreased amount of ohmic resistance in the starting resistor; to make possible a more rugged mechanical resistor construction for a given space and which can use cheaper material and to provide higher speeds and higher generator voltage with the same starting resistance and same mechanical and electrical strains.

It is my object to provide a field bleeder circuit imposed upon the generator and motor circuit for suitably raising and lowering the voltage in the circuit.

It is my object to employ a suitable resistor to prevent sudden inrushes of current in the motor when the controller is moved quickly to cut out all starting resistance, and it is my object to provide a suitable resistor for governing the amount of generator voltage reduction when the primary switches are closed.

It is my object to provide a balancing of voltages through the equipment and circuits I provide for effecting the above objects.

Referring to the drawings:

Figure 1 is a wiring diagram showing the arrangement of the hoist and crowd circuit in its "at-rest" position with the generator circuit alone hot due to the operation of the generator by some prime mover; and Fig. 2 is a similar view showing all the switches closed.

Conditions of operation of excavating shovels

In order to fully understand the problems confronting the solution of this problem of providing proper rheostatic control particularly for small direct current shovels and for providing for such equipment very quick starting with ability to lift a light load at high speed, a heavy load at low speed and to exert a maximum pull at stall without undue mechanical or electrical strains, it is necessary to understand the conditions under which shovels operate.

An electric shovel is called upon to deliver widely varying power. It may be operating at practically no load at one moment and in a fraction of a second later it may be called upon to deliver practically its maximum load. The speed with which it can be accelerated and the facility with which it can exert its ability to lift light loads at high speeds, heavy loads at low speed and to exert the maximum pull when the dipper bucket is practically at stall in the bank, determine the efficiency of the shovel.

Heretofore, the rheostatic controlled shovels have required elaborate electrical protective equipment to protect the equipment against excessive overloads. There is a very distinct and objectional cause of time lag in the functioning of this protective electrical equipment, such as by-pass systems and magnetic switches and the like. Such a time lag is necessary in the old type of equipment to insure that, if the motors are momentarily overloaded, the overload will continue to an extent which is not harmful, as that would materially slow down the operation of the motors handicapping production. Thus a time lag is necessary before the protective equipment operates to prevent unnecessary delays.

Again, heretofore, it has been necessary to use a resistor which is varied in order to permit the generator voltage to be regulated over certain narrow limits, but this requires generators with a shunt field capable of standing about from seventy-five to eighty percent of the generator armature voltage. This type of field is objectionable, is highly inductive and is very slow in its response to changes. Hence, when the generator is connected with the motor through the armature resistor and this resistor is cut out step by step, generator voltage does not fall off quickly due to the cutting out of the resistor to any practical extent but it sends enough additional current through the circuit to cause the voltage drop of the circuit with the reduced resistance in it equal to approximately the voltage of the generator before this resistance was cut out. This means a rather considerable increase in circuit current when the amount of resistance cut out is a relatively large percentage of the resistance of the circuit. Hence, when the motor has completed its acceleration and is carrying its load, sudden fluctuations of load on the motor are transmitted to the generator causing fluctuations of current delivered by the generator to the motor similar to those fluctuations of current caused by the sudden cutting out of resistance in starting the motor which gives the generator the tendency to send sudden inrushes of current into the motor in excess of what the action demands if the field of the generator is capable of acting instantaneously.

Consequently, as a solution of this problem, if the total resistance of the generator and leads is increased and the starting resistance (the armature resistance which is cut out step by step) is left the same, it follows that the inrush current will be smaller than the inrush current obtained when the resistance of the generator and the leads is not increased. This results in smoother and better commutation of the motor and generator and less severe mechanical and electrical strains on the equipment.

If the voltage of the generator is reduced before connecting it to the motor through the starting resistor, for the certain inrush current, the amount of resistance required will be less.

If, immediately after connecting the motor to the generator through the starting resistance, the motor begins to accelerate, the inrush current will tend to fall off as the counter voltage of the motor rises in value.

However, if the motor handles the inrush current and if the generator voltage rises in value along with the rise in the counter voltage generated, the inrush current will not fall off but will be maintained constant in value. This will produce a constant acceleration torque in the motor.

If, on the other hand, the rise in the voltage of the generator is less than the rise of the voltage in the motor, this inrush current will tend to fall off but to a lesser degree than where the generator voltage is maintained constant. The best practical condition of acceleration for this type of control would then be to have the current fall off just sufficient so that when the next small step of starting resistance is cut out the inrush current would, at that time, be equal to the initial inrush current. The following steps of resistance can then be cut out in exactly the same fashion until all the resistance has been cut out except that which constitutes the permanent resistance of the circuit.

Hence, I find that by providing a generator circuit, a motor circuit connected thereto, a bleeder circuit connected into the motor and the generator circuit and resistance of permanent character in association with the variable resistor in the motor field circuit, I am enabled to so adjust the conditions of the circuits as to secure quick starting, high speed with light loads, low speed with heavy loads and maximum pull at stall.

Generator circuit

The generator circuit is composed of a generator G. This generator has connected thereto by the wire 1 a series field 2 which, in turn, has connected to it by the terminal 3 a resistor, designated 4, that is connected by an intermediate wire 5 with the other section 6 of the resistor that is, in turn, connected to the shunt field 7 that is, in turn, connected by the wire 8 and wire 9 to the commutating field 10 of the generator G, to which it is attached by the wire 11. The generator is driven by any form of prime mover designated 12. While the shovel is operating the circuit just described is always hot and the current is traveling in the direction indicated by the arrows. This is the generator circuit.

Motor circuit

HM indicates the hoist motor. The hoist motor is provided on one side with the lead 13 that connects the motor to its commutating field 14. This commutating field is connected to the permanent resistor 15. This side of the motor circuit is adapted to be connected to the generator circuit by the primary switch AA. This switch is a reversible switch. It is interconnected with and adapted to be simultaneously operated with the second of the primary switches, designated A. This switch is not reversible.

Bleeder circuit

It is connected by the lead 16 to the hoist motor. On the other side it is connected to the lead 17 that forms a part of the bleeder circuit, the other side of which is connected by the wire 18 to the terminal 19 in the generator circuit. Between the wires 17 and 18 is located the permanent resistance 20. This combined motor commutation field circuit and the bleeder circuit having been simultaneously connected to one another and to the generator circuit by the closing of the primary switches A and AA are now in a position to be connected to the series field motor circuit and the variable resistance.

Motor series field circuit and variable resistance

The switch B is the secondary switch which is closed after the switches A and AA have been simultaneously closed. Upon the closing of the switch B the bleeder circuit and the commutating field circuit of the motor have been connected with the series field circuit of the motor. Thereupon, the lead 21 connects the variable resistance 22. This resistance is provided with the slide wire base terminal 23 and typical stages of resistance 24, 25, 26, 27, 28 and 29. 30 indicates the slide wire contact member. 31 indicates the lead that connects this circuit into the series field 32 of the motor and 33 indicates the lead that connects the series field to the terminal 3 in the generator circuit.

The variable resistance 22 is a progressive resistance, the resistance steps increasing as the contact member 30 progresses from 29 to 23 to thereby give a more nearly uniform heating in the controller.

Field bleeder circuit

The addition to the circuits of the sections 17, resistor 20 and 18 constitutes the bleeder circuit proper but when the bleeder circuit operates it embraces and is composed of, in effect, the standard motor commutating circuit heretofore described, such as from AA, 15, 14, 13, HM and 16 with switch A.

Current directions

The current in the generator circuit never changes direction. When all switches are closed, due to the difference in potential between the points 34 and 19 the current flows from 19 through 18, 20, 17, A, 34, 16, HM, 13, 14, 15, AA at which time the variable resistor slide wire 30 is not passed beyond the medium point of the variable resistor 22 but upon passing beyond that point, as will be hereinafter described, the current divides so that a part of it travels in the direction from 34, 16, HM, 13, 14, 15, AA, to the generator circuit and on the other side travels up from 34 through switch A, 17, resistor 20, 18, 19 and into the generator circuit for the purposes hereinafter described.

The series field circuit of the motor is arranged so that the current travels in the direction 33, 32, 31, 29 through the resistor 22, 21, switch B and thence into the circuits hereinbefore mentioned and described.

Relative voltages

At certain important points in the system, the voltages vary and this difference in potential at these points is essential to the operation of my circuits and apparatus. The voltages I indicate are merely typical and not exclusive. Assuming a given motor load of a series motor, the conditions are about as follows as to voltage in a relative sense.

Off position voltages

In the "off" position the switch AA will have zero voltage; switch A, 150 volts; point 19, 150 volts; point 3, 300 volts; and point 7a, zero voltage with the current direction as indicated in the generator circuit.

*Starting position: Primary switches closed*

In this position, the voltage at 3 is 150 volts; at 19, 65 volts; at AA and 7a, zero voltage, and at switch A and 34 at practically zero voltage. The current is then flowing, as described above, from point 19 through resistor 20 and thence down through the hoist motor over to the generator circuit at 7a.

The voltage of the generator is quite low and the maximum generated current is reduced so as to furnish suitable maximum current inrush to the motor through the starting resistance, thereby reducing the electrical and mechanical strains to the minimum.

*Starting position: Closing of primary and secondary switches*

In this position, point 3 has 165 volts, point 19 has 75 volts, switch AA, zero voltage, point 7a, zero voltage, point 34, 20 volts, and switch A, 20 volts. As switch B is closed the series field is now hot.

*Starting position: Intermediate position of slide wire contact on variable resistor*

Assuming the slide wire contact 30 is about half way across the starting variable resistor 22, the voltage of the respective points will be as follows. At 3, 275 volts; at 19, 137½ volts; switch AA and point 7a, zero voltage; at point 34, 137½ volts and switch A, 137½ volts. No current will be flowing through resistor 20. The current direction will be the same in the generator circuit but since the voltage at switch A and at 19 is the same no current will be flowing through the resistor 20. The motor series field circuit will remain the same and there is no flow of current in this bleeder circuit section. On the other half of the circuit through 16 and the hoist motor the current is flowing downwardly to the generator circuit.

*Starting: From intermediate to full on position on the variable resistor*

When the slide wire contact 30 is moved from the half way point on the variable resistor as at, for instance, 25 over to 29, the voltage at 3 is 400 volts; at 19, 225 volts, at switch AA and point 7a, zero voltage, and at point 34, 400 volts, with the result that the current conditions are as above in the preceding paragraph except that the greater voltage being at 34 and the lesser voltage at 19 current is flowing through 20 from 34 to 19 as well as from 34 through 16 to the hoist motor and thence to the generator circuit.

The purposes of these relative voltages will be apparent from the following description.

*Control of the switches*

For the purpose of clearness the diagrams do not show the switches interconnected but, in practice, a single controller for the hoist circuit is provided with a single controller handle which operates the switches A and AA to close them simultaneously, then the switch B is closed by further movement of the handle, and then the slide wire contact member 30 is moved over the variable resistance 22 from point to point by further movement of the controller handle.

Likewise, in the crowd control, a single controller is provided, which closes the primary switches hereinafter to be designated in the main circuit, then the secondary switch, and then moves the slide wire contact member over the variable resistance in the circuit.

*Nature of the equipment*

The generator is a shunt-wound generator, preferably with a drooping voltage characteristic. Depending upon the type of prime mover used to drive the generator, it is sometimes advisable to add the light series field 2. If the speed regulation is good as compared with that of an induction motor suitable for use as the prime mover, this series field is usually unnecessary and a straight shunt generator is used.

*Stages of operation*

The first step is to prepare for the load by closing the switches AA and A simultaneously, thus bleeding current from the generator field through the bleed circuit to reduce the generator voltage in preparation for taking on the load.

Part of the current in 4 is bled from the generator field circuit and by-passed through the motor armature and the resistance 15. Therefore, it is shunted around the generator field for the purpose of reducing the field strength of the generator to reduce maximum current inrush on starting.

Then close the switch B to get current to start the motor HM and to bring in the hoist motor series field circuit.

Thereafter, the motor generates counter voltage raising the voltage at the switch B so that current flow from 19 to switch B will decrease and the current in resistance 20 is decreased so that the generator voltage tends to rise because of higher voltage across the field.

Then start cutting out the resistance 22 so that the current will rise in the motor HM. Consequently, the motor HM tends to accelerate and the voltage tends to rise in it. The field strength of the generator rises due to incoming voltage as the voltage at B tends to rise more rapidly than at 19 whose value is more or less constant.

When about one-half of the resistance 22 is cut out of the circuit the voltage at 34 equals the voltage at 19 and no current flows through the resistance 20. This gives the same operation as though the bleeder circuit 17, 20 and 18 were cut out.

As the slide wire 30 proceeds from the middle point of the resistance 22 towards 29 the bleeder circuit raises the generator circuit voltage above normal to give the motor a higher maximum speed than otherwise possible.

The motor has now been given the proper torque. It is now necessary to give the motor speed. This is done by cutting out the steps of resistance as indicated which raises the voltage applied to the motor causing it to generate a higher counter voltage and to rotate at higher speeds as the counter voltage of the motor rises and the difference in voltage between 34 and 19 decreases which reduces the amount of current shunted out of field 7 thereby raising the generator voltage. The increasing voltage applied to the motor for increasing the speed is then due to a combination of cutting out the resistance 22 and the raising of the generator voltage due to the bleeder circuit connections.

Hoist motor stop operation

To stop the hoist motor the reverse operation of handling the starting switches is effected. This is done by first cutting in, in succession, all parts of the variable resistance 22 until the slide wire 30 has reached 23. Switch B is then opened and then switches A and AA are opened together.

Resistance 15

When the permanent resistance 15 is in line the heating on the hoist controller is decreased by the reduction of the arc. The presence of the resistance 15 gives the same effect as a greater number of steps in the resistance 22 with a decreased arc without increasing the size or changing the design of the controller. The greater the number of steps the smaller the arc so that I secure the same effect in a simpler, more compact and cheaper manner by the utilization of the resistance 15 as located. It is possible to employ a smaller and more compact controller of less expensive character while at the same time, decreasing the heating of material and increasing the life of the entire equipment.

Characteristics of generator field 7

In accomplishing my invention, I employ a low inductive and low resistance field of the generator, such as 7. I prefer to use a generator with a drooping voltage characteristic.

Switches AA and field bleeder circuit

The arrangement of the switches AA and the field bleeder circuit is for the purpose of reducing voltage for the generator immediately prior to throwing the hoist motor on the circuit in order to decrease the current inrush of the hoist motor when its armature circuit is closed by closing the switch B. This has the following factors:

(1) Bad commutation on the hoist motor and generator is eliminated.

(2) The arrangement prevents excessive and unnecessary heating of both the generator and the hoist motor.

(3) It prevents excessive mechanical and electrical strains.

(4) It makes possible a decreased amount of resistance in the starting resistor.

(5) It makes possible a more rugged mechanical resistor construction for a given space and makes possible the use of cheaper material.

(6) It makes possible higher speeds and higher generator voltage with the same starting resistance and with the same mechanical and electrical strains.

Switch B and the slide wire variable resistance

The purpose of this arrangement of switch B and the slide wire variable resistance is to begin raising the generator voltage by field control while simultaneously cutting out the starting resistor. The bleeder circuit is used to raise as well as to lower voltage at the switch B.

Resistors 15 and 20

The resistor 15 is used to prevent the inrush of current on the motor when the controller is moved quickly to cut out all the resistance. Resistor 15 for that purpose is made equal to the resistance of the motor.

The resistor 20 governs the amount of the generator voltage reduction when switches A and AA are closed.

Crowd circuit

The crowd circuit cooperates with both the generator circuit and the hoist motor circuit with the bleed circuit.

Series motor field 32

The series motor circuit 32 should be so located anywhere in the motor circuit so that the crowd circuit current must pass through this motor field but no other part of the hoist motor circuit.

Crowd circuit

The crowd circuit is superimposed upon the generator circuit and the hoist motor circuit. The point of attachment 35 of the crowd circuit can be anywhere within the motor circuit but must be so arranged that the crowd circuit current shall pass through the hoist motor field 32 but no other part of the hoist motor circuit. The crowd motor circuit consists of the line 36 through which the current flows from the point 35 to the point 37 where the series field 38 of the crowd motor 39 is located. This field must be located in a non-reversing section of the circuit, as indicated. The wire 40 is connected to the variable resistance of the crowd circuit 41 at the point 42.

*The crowd generator field strength circuit*

Between the crowd motor series field and the variable resistance is attached the wire 43 of the generator field strength circuit which raises the generator voltage after all the starting resistance is cut out in order to give the crowd motor 39 higher speed at light loads and greater pull under heavy loads with the maximum pull at stall.

This arrangement also materially reduces the amount of the starting resistance 41 required as compared to the amount of such resistance which would be required to start the motor from a generator having a voltage equal to that obtained when the switch 44 is closed which connects the wire 45 into the generator circuit completing the generator field strength circuit. This wire 45 is connected at 46 to the resistor section 4 of the generator circuit. Its point of attachment is determined by the amount of field strength desired. The nearer the point of attachment of the wire 45 to the field 7, the greater the increase in generator voltage.

*Crowd variable resistance*

The crowd variable resistance consists of a series of steps of resistance such as 47, 48, 49, 50 and 51. The slide wire contact member 52 is attached at 53 to the lead 54 that is connected to the reversing switch 55. This reversing switch is connected by the lead 56 to the crowd motor 39.

*Crowd motor*

The crowd motor is preferably about one-half the size of the hoist motor HM. If these motors are subject to heavy peak loads for very short periods of time, they will not burn up if the current is made to divide between these motors in proportion to their size. If these motors are both stalled at the same time the current flowing through the motors will equal the maximum current that can be put out by the generator and the current will divide between the motors in proportion to the ability of the motors to dissipate the heat.

Since the motor 39 is a small motor it may be desirable under light load condition to have it operate with switch 44 open. This in effect has reduced the generator size down to the size of the motor and will thereby lighten the electrical and mechanical strains due to rapid acceleration of the motor when the starting resistor is rapidly cut out. This also reduces the heating in the motor and generator.

57 indicates the commutating field of the crowd motor 39.

*Permanent crowd resistor*

This permanent crowd resistor of the crowd motor is designated 58 and is connected next in line adjacent the commutating field 57. The function of this resistance is the same as that of 15 in the hoist motor circuit.

*Crowd primary switches*

The crowd primary switches are reversible as indicated at 55 and 59. The switch 59 when closed connects the crowd motor armature to the generator circuit at 61.

*Crowd operation*

Assuming that the generator circuit is hot and the hoist motor circuit is also in operation, I superimpose the crowd circuit upon these circuits in the following manner.

*Crowd starting: First phase*

I first close the switches 55 and 59 simultaneously by one movement of the controller handle. Current then flows in the circuit as heretofore described from 35 through 39 around 61 up through the generator and back to 35.

*Crowd starting: Second phase*

The slide wire 52 is then moved to cut out the resistance 41 which is progressively smaller from 53 to 42. This eliminates the resistance progressively.

*Crowd starting: Third phase (when crowding out)*

With the crowding out of the dipper bucket which is being forced into the bank I next close switch 44 and bring in the generator field strength circuit 43, 44, 45 and 46. I thereby short circuit that part of the line from 3 to 46 for the purpose of raising the generator voltage by strengthening the generator field.

*Crowd reverse*

To bring about a reversal of the crowd operation, switch 44 is first opened, then the variable resistance 41 is cut in and then the switches 55 and 59 are simultaneously opened. After this is done, then the crowd operation is started in the reverse direction by reversing the position of switch 55 and 59 (reversable switches) and then cut out the variable resistance. The generator field strengthening circuit is not cut in during this operation.

A controlling system embodying the generator and hoist motor circuits herein illustrated is shown and claimed in my co-pending application Serial No. 358,362, filed April 26, 1929.

It will be understood that I desire to comprehend within my invention such modifications as may be necessary to adapt it to varying conditions and uses.

Having thus fully described my invention, what I claim as new and desire to secure by Letters Patent, is:

1. In a control system for electrically operated shovels, a generator, a circuit therefor including an armature, a resistance and a generator shunt field, a hoist motor, a circuit for said hoist motor including a hoist motor armature connected across said generator shunt field and a part of the resistance in said generator circuit, and also including a hoist motor series field and a variable resistor connected across another part of the resistance in said generator circuit, means for controlling said connections, a crowd motor, a circuit for said crowd motor connected with said hoist motor circuit between said hoist motor series field and said hoist motor variable resistor and with said generator circuit between said generator shunt field and said generator armature, and a variable resistor in said crowd motor circuit.

2. In a control system for electrically operated shovels, a generator, a circuit for said generator including an armature and a shunt field, a hoist motor, a circuit for said hoist motor including an armature connected with said generator circuit on one side of said generator shunt field, and a series field connected with said generator circuit on the other side of said generator shunt field, and also including a variable resistor, a crowd motor and a circuit for said crowd motor including an armature so connected with said hoist motor circuit that the current will pass through the series field only of said hoist motor circuit, said crowd motor armature being also connected with said generator circuit on that side of the generator shunt field opposite the side with which said motor series field is connected.

3. In a control system for electrically operated shovels, a generator, a circuit for said generator including an armature and a shunt field, a hoist motor, a circuit for said hoist motor including an armature connected with said generator circuit on one side of said generator shunt field, and a series field connected with said generator circuit on the other side of said generator shunt field, and also including a variable resistor, a crowd motor and a circuit for said crowd motor including an armature connected with said hoist motor circuit between said hoist motor series field and said variable resistor and connected with said generator circuit on that side of said generator shunt field opposite the side with which said motor series field is connected.

4. In a control system for electrically operated shovels, a generator, a circuit for said generator including an armature and a shunt field, a hoist motor, a circuit for said hoist motor including an armature and a series field connected with said generator circuit on opposite sides of said generator shunt field and also including a variable resistor, a bleeder circuit connected with said generator circuit on that side of said generator shunt field with which said motor series field is connected and adapted to be connected with said series motor circuit between said variable resistor and said motor armature, a crowd motor, a circuit for said crowd motor including an armature so connected with said hoist motor circuit that the crowd current will pass through the series field only of said hoist motor circuit, said crowd motor armature being connected with said generator circuit on that side of said generator shunt field opposite said motor series field.

5. In a control system for electrically operated shovels, a generator, a circuit therefor including an armature, a resistance and a generator shunt field, a hoist motor, a circuit for said hoist motor including an armature connected with said generator circuit on one side of said generator resistance and said generator shunt field, and a series field connected with said generator circuit on the other side of said generator resistance and shunt field, and also including a variable resistor, a bleeder circuit connected between the ends of the resistance in said generator circuit, means for connecting said bleeder circuit with said hoist motor circuit at a point between said variable resistor and said motor armature, a crowd motor and a circuit for said crowd motor including an armature connected with said hoist motor circuit between said motor series field and said variable resistor and connected with said generator circuit on that side of said generator shunt field opposite said motor series field, said crowd motor circuit also including a variable resistor.

6. In a control system for electrically operated shovels, a generator, a circuit for said generator including an armature, a resistance and a generator shunt field, a hoist motor, a circuit for said hoist motor including an armature and a series field connected with said generator circuit on opposite sides of said generator shunt field and also including a variable resistance, a crowd motor, a circuit for said crowd motor comprising an armature and a series field on one side of said armature and so connected with said hoist motor circuit that the crowd current will pass through the series field only of said hoist motor circuit, the other side of said crowd motor armature being connected with said generator circuit on that side of said generator shunt field opposite the side with which said hoist motor series field is connected, and a generator field strengthening circuit connected with said crowd motor circuit between said crowd motor armature and said hoist motor series field and with said generator resistance between the ends of the latter.

7. In a motor control system, a generator, a circuit therefor including an armature, a resistance and a field, a motor, a circuit for said motor including an armature and a series field connected with said generator circuit on opposite sides of said generator resistance and also including a variable resistor, a second motor, a circuit for said second motor including an armature connected with the first mentioned motor circuit between said series field and said variable resistor and connected with said generator circuit between said generator resistance and that side of said generator armature opposite the side with which the first mentioned motor series field is connected, said second motor circuit also including a series field between said second motor armature and said first mentioned motor circuit, and a generator field strengthening circuit connected with said second motor circuit between said second motor armature and said second motor series field and with the resistance in said generator circuit between the ends of said resistance.

8. In a motor control system, a generator, a circuit therefor, including an armature, a resistance and a generator shunt field, a motor, a circuit for said motor including a series field and an armature connected with said generator circuit on opposite sides of the generator resistance and shunt field, a second motor, a circuit for said second motor including an armature connected with said generator circuit on that side of said generator shunt field with which the first mentioned motor armature is connected and also including a series field so connected with said first mentioned motor circuit that the second motor current will pass through the series field only of the first mentioned motor circuit, and a variable resistor between said second motor series field and said second motor armature, and a generator field strengthening circuit connected with said second motor circuit between the series field and the variable resistor therefor and with the resistance in said generator circuit.

9. In a motor control system, a generator circuit including an armature, a resistor and a generator shunt field, a motor, a circuit for said motor including an armature and a series field connected with said generator circuit on opposite sides of said generator shunt field and said generator resistor, and also including a variable resistor, a bleeder circuit connected to the resistor of the generator circuit and adapted to be connected to the variable resistor of said motor circuit, a second motor, a circuit for said second motor including an armature and a second motor series field connected to the first mentioned motor circuit between the series field and the variable resistor therefor and also including a variable resistor, and a generator field strengthening circuit connected with said second motor circuit between the series field and the variable resistor therein and also connected with said generator resistor.

10. In a motor control system, a generator, a circuit for said generator including an armature, a generator shunt field, and a resistance in series with said shunt field, a plurality of motors, circuits for the respective motors each including an armature connected with said generator circuit on opposite sides of said generator shunt field, and generator field strengthening circuits connected with the respective motor circuits and each connected with said generator resistance between the ends of the latter.

In testimony whereof, I affix my signature.

HENRY S. JACOBS.